May 12, 1931. S. KUNO 1,805,289
HOE
Filed Aug. 27, 1929

Inventor
Shichigoro Kuno.
By A. J. O'Brien
Attorney

Patented May 12, 1931

1,805,289

UNITED STATES PATENT OFFICE

SHICHIGORO KUNO, OF OGDEN, UTAH

HOE

Application filed August 27, 1929. Serial No. 388,716.

This invention relates to improvements in hoes of the type employed in cultivating gardens and in the cultivation of beets and for analogous purposes.

In the cultivation of vegetables, and especially in the cultivation of beets, a large amount of work must be done by means of hoes. It has been found that hoes of the ordinary construction are open to the objection that weeds and grasses accumulate around the portion of the handle that is attaced to the hoe blade and this therefore makes it necessary for the workman to stop quite frequently for the purpose of cleaning his hoe.

It is the object of this invention to produce a hoe which shall be provided with means for deflecting weeds and grasses away from the handle in such a manner that the hoe will automatically remain clean and therefore the time that is usually consumed in removing the accumulation of grasses and weeds can be saved. In addition to the loss of time due to the necessity of cleaning the hoe, the accumulated weeds and grasses are also objectionable for the reason that they greatly increase the weight of the hoe and in a corresponding manner increase the effect necessary to operate it.

My invention, briefly described, consists in adding to an ordinary hoe a combined deflecting and cutter blade, the ends of which are secured to the upper corners of the hoe and which extends over the handle in such a manner that the parts of the blade between the points of attachment are spaced from the hoe blade. This cutter and deflector has a cutting edge which serves to sever the weeds and grass and owing to its outward inclination it tends to deflect the weeds outwardly and to slide them along the cutting edge, thereby facilitating the cutting operation.

Having thus briefly described the invention, I will now proceed to describe the same in detail, and for this purpose reference will be had to the accompanying drawings in which the preferred embodiment of the invention has been illustrated, and in which.

Figure 1:
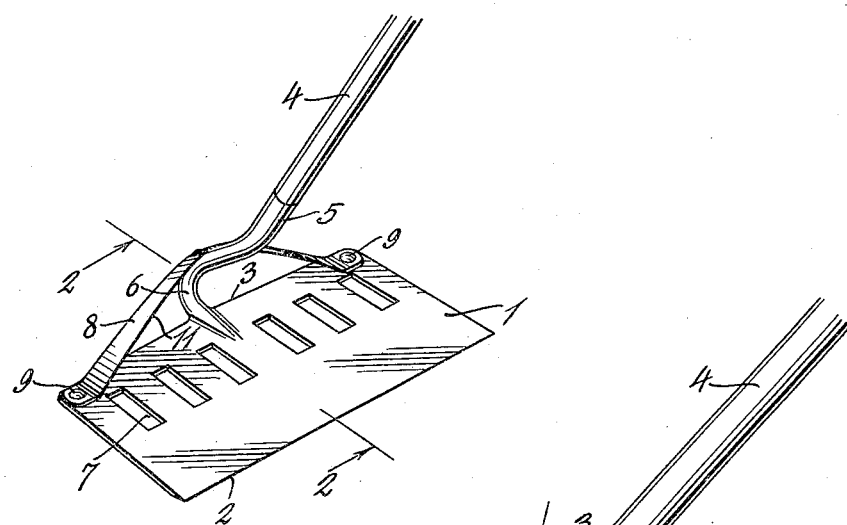
Fig. 1 is a perspective view of a hoe provided with my improved deflecting and cutting blade.
Figure 2:
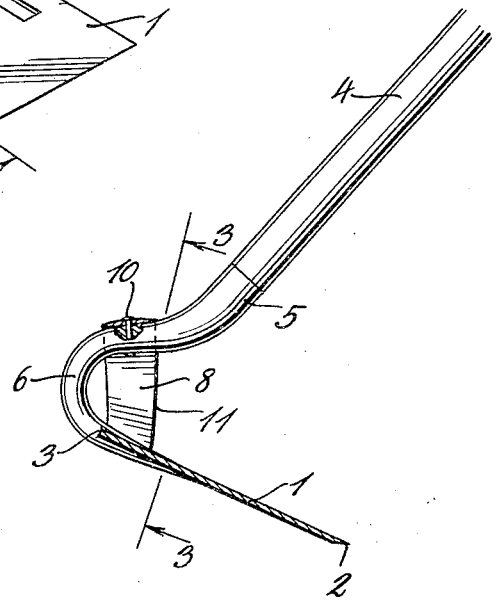
Fig. 2 is a transverse section taken on line 2—2, Fig. 1.
Figure 3:
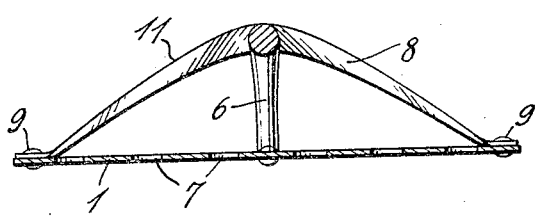
Fig. 3 is a section taken on line 3—3, Fig. 2.

In the drawings reference numeral 1 designates the hoe blade. This is of ordinary shape and size and in the example shown is substantially rectangular. The front cutting edge has been indicated by reference numeral 2, and the rear or top of the hoe by numeral 3. The handle consists of a wooden portion 4, one end of which extends into a socket 5, at the end of a gooseneck 6, which is integrally connected with the top of the blade. For certain purposes the blade is provided with a plurality of openings 7, but these have nothing to do with my invention which is as well adapted for hoes that are not provided with openings as for those having openings in the manner shown. When a hoe of the construction shown, but which is not provided with my improvement is employed for weeding, the grasses and weeds accumulate in the curved portion of the gooseneck to such an extent that the workman must frequently stop to remove these accumulations and to clean the hoe.

My invention consists in adding to the ordinary hoe, a combined deflector and cutting blade which has been designated by reference numeral 8. This blade may be of steel and has its ends secured to the upper corners of the hoe blade by means of rivet 9. The blade passes over the outside of the gooseneck 6 to which it is secured by means of a rivet 10. After the blade has been attached to the hoe, it has the appearance shown in the drawing. The lower or front edge of the blade, which has been designated by numeral 11, is preferably sharpened so as to form a cutting edge, and if desired the rear side of this blade may also be sharpened. When the hoe is in use, the weeds and grasses will come in contact with the edge 11 of the blade and will either be cut immediately or will slide outwardly along the inclined edge of the blade and will therefore soon be severed by this sliding action.

The hoe that has just been described is used in the same manner as any other hoe of this type, but owing to the fact that the blade 8 has a sharp cutting edge, the weeds and grasses will be cut and therefore there will be no accumulation about the handle and this prevents the hoe from becoming heavy and unwieldy and makes it possible for the workman to do more work with less effort and in a shorter time than with hoes that have not been provided with my improvement.

Attention is directed to the openings in the hoe which are of great advantage when the hoe is used in soft dirt and in mud as it prevents the accumulation of dirt and mud on the front surface of the hoe and it is therefore much easier to keep a hoe clean when it is provided with openings like those shown in the drawing. Although the deflecting and cutting blade can be used with hoes that have openings or which are not provided with openings, the combination of the cutting blade and a hoe blade having openings serves to improve the beneficial results sought to be obtained by this invention.

Having described the invention what I claim as new is:

A hoe comprising a blade having a shank of gooseneck shape secured to the center of the rear edge thereof, the end of the shank being provided with attaching means for a handle, a narrow auxiliary blade having its ends connected with the rear corners of the blade, the auxiliary blade being bowed away from the blade in the direction in which the shank extends and secured at its center to the gooseneck shank, the front edge of the auxiliary blade being sharpened.

In testimony whereof I affix my signature.

SHICHIGORO KUNO.